Sept. 24, 1946.                    W. H. WIRKLER                          2,408,121
                    DIRECTION FINDING SYSTEM WITH FREQUENCY SHIFT
                             Filed March 30, 1940              3 Sheets-Sheet 1
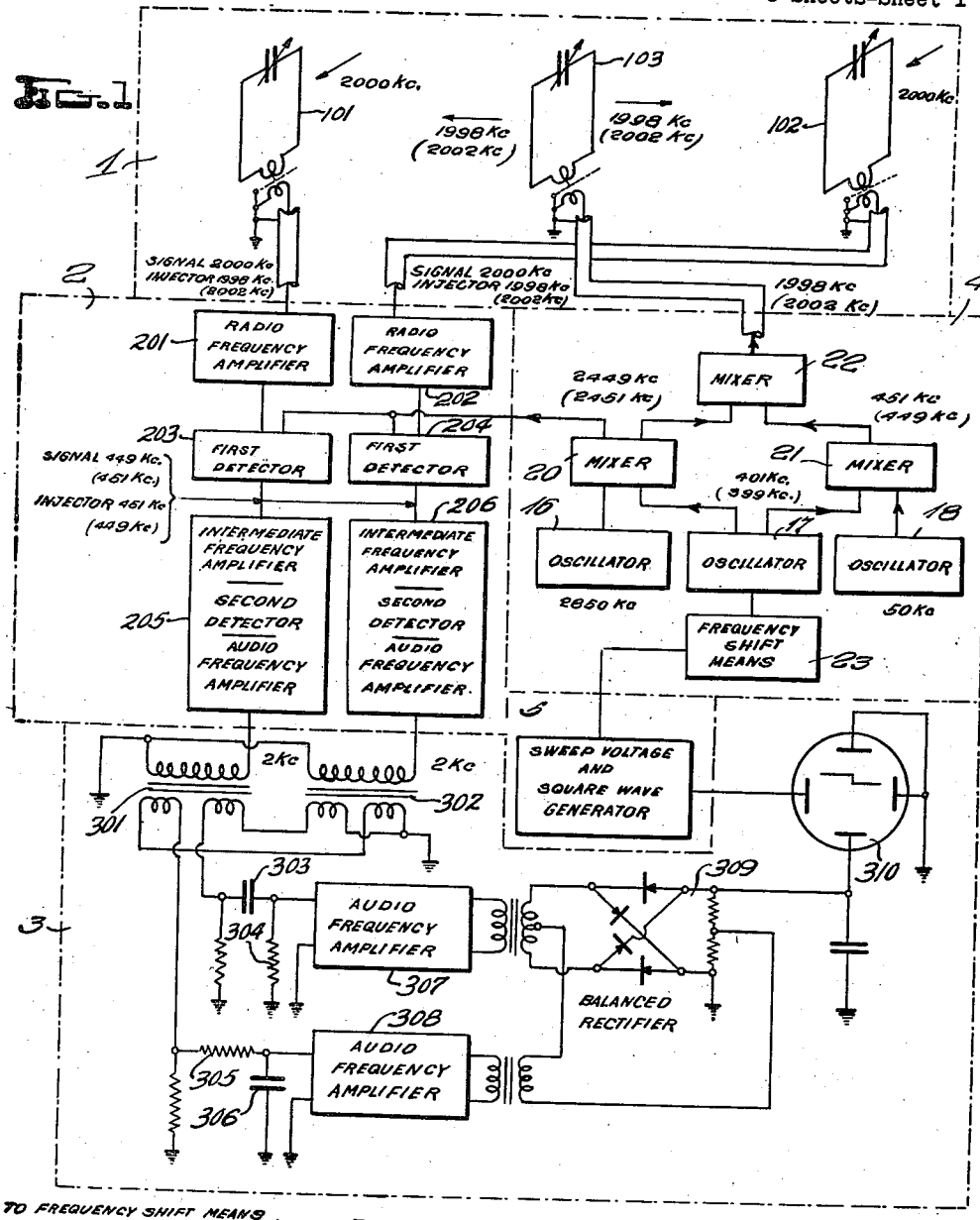
INVENTOR.
Walter H. Wirkler,
BY
John Q. Brady
Attorney Sept. 24, 1946.   W. H. WIRKLER   2,408,121
DIRECTION FINDING SYSTEM WITH FREQUENCY SHIFT
Filed March 30, 1940   3 Sheets-Sheet 2
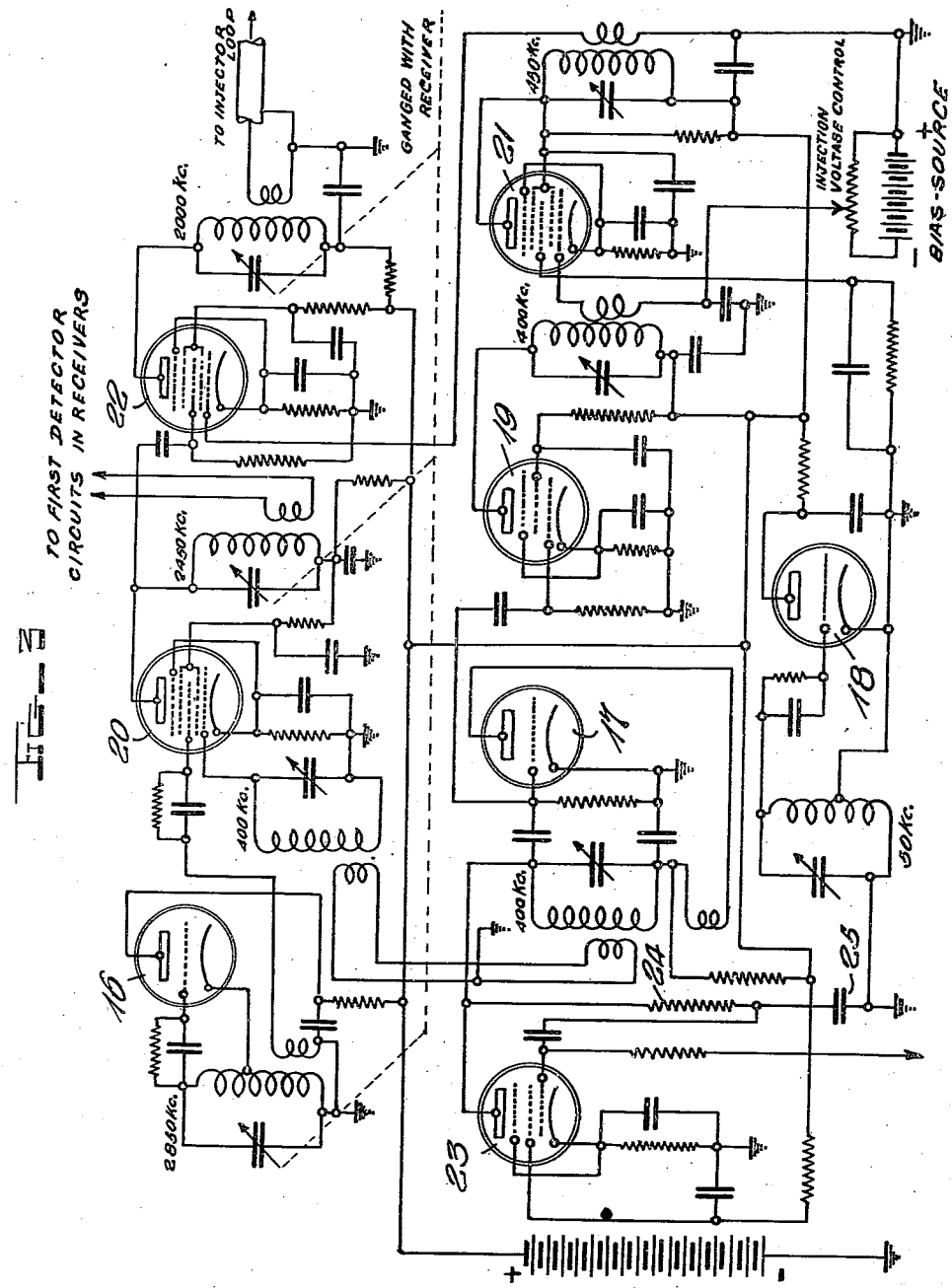
INVENTOR.
Walter H. Wirkler,
BY
John C. Brady
Attorney.

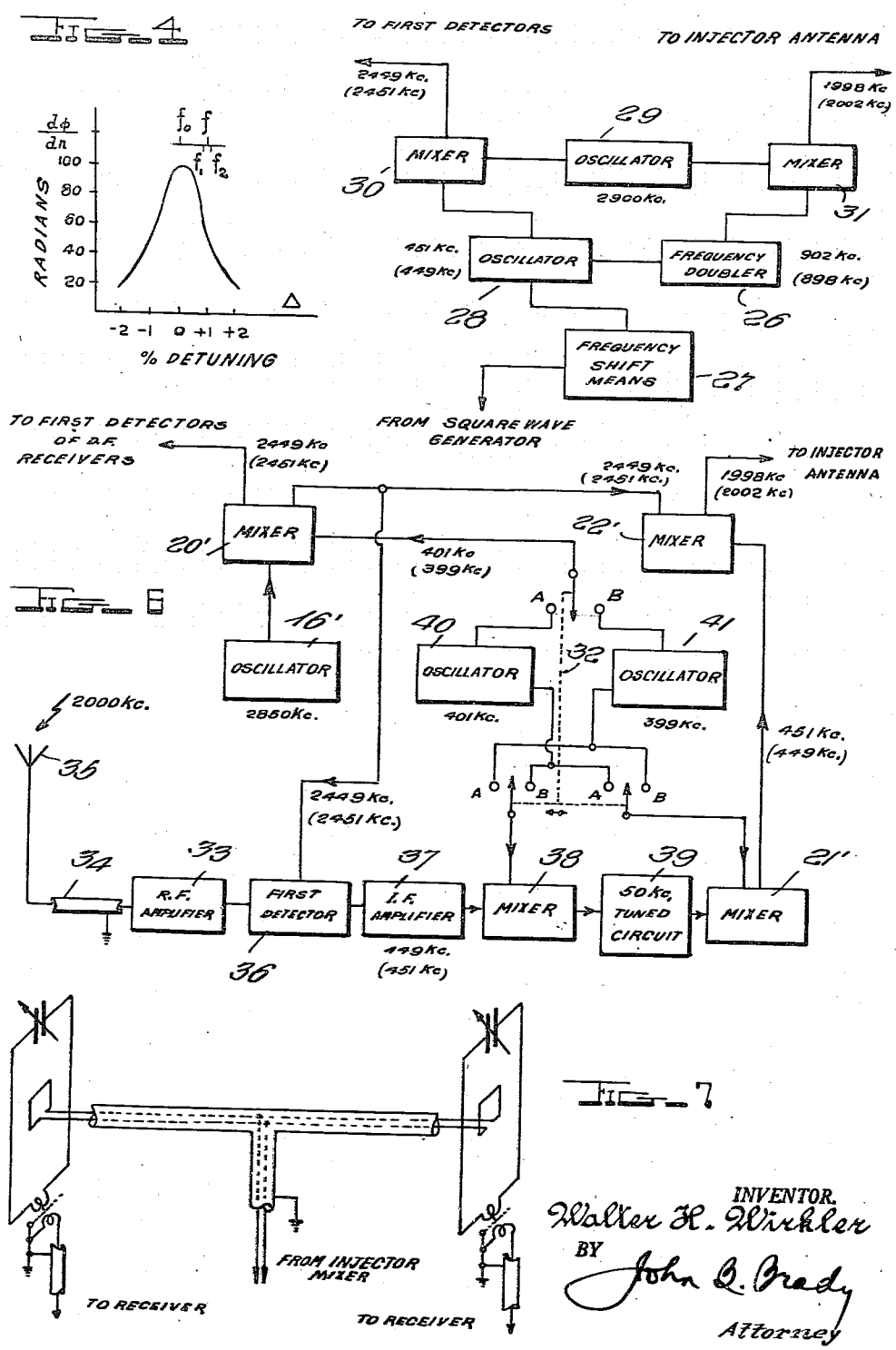

Patented Sept. 24, 1946

2,408,121

UNITED STATES PATENT OFFICE 2,408,121

DIRECTION FINDING SYSTEM WITH
FREQUENCY SHIFT

Walter H. Wirkler, Cedar Rapids, Iowa, assignor to Collins Radio Company, Cedar Rapids, Iowa, a corporation of Iowa Application March 30, 1940, Serial No. 327,011

17 Claims. (Cl. 250—11)

My invention relates broadly to radio direction finding systems, and more particularly to an arrangement of the heterodyne type with visual indicating means.

This application is a continuation-in-part of my copending application Serial No. 294,522, filed September 12, 1939, for Radio direction finding system, which application discloses visual indicating means in an arrangement of the heterodyne type employing an injection antenna in cooperation with dual receiving antennas as disclosed in my copending application Serial No. 274,039, filed May 16, 1939, for Heterodyne radio direction finding system. In my copending application Serial No. 294,522, supra, visual indication is effected by providing commutating means in circuit with the receiving antennas by which the antennas are alternately connected with separate receiving circuits, the outputs of which are combined to produce a direct voltage whose polarity shifts with the antenna commutation when a phase difference exists in the signals received, whereby directional indications are visually represented. My present invention is directed to an arrangement of frequency shifting by which change in polarity of a direct voltage resulting from combination of signals received out of phase may be obtained for producing a visual indication without commutation of the receiving antennas as in the aforesaid application, Serial No. 294,522.

Furthermore, it has been pointed out in my application Serial No. 294,522, that tuned circuits in the antenna systems and in the receivers, both at signal frequency and at intermediate frequency, produce a phase shift in the audio heterodyne tone and that inequalities in the phase shift in the two receivers produce bearing errors in the directional indication. The errors from the intermediate frequency circuits are more severe than those originating in the signal frequency circuits and are, in the main, the errors eliminated by the antenna commutation of my copending application Serial No. 294,522. My present invention not only accomplishes a like result but furthermore substantially eliminates the errors originating in the antennas themselves operating at signal frequencies.

One of the objects of my invention, therefore, is to provide frequency shifting means for reversing the indicating voltage for operating visual indicating means, and for substantially eliminating bearing errors caused by phase inequalities introduced in the antenna circuits as well as those produced in the receiver circuits.

A further object of my invention is to provide means for periodically interchanging the frequency of the signal voltage and the heterodyning voltage as they appear in the intermediate frequency amplifier circuits of the radio receivers, for the purpose of substantially eliminating bearing errors caused by phase inequality of the receivers as well as the antennas.

Another object of my invention is to provide means for periodically shifting the frequency of the voltage supplied to the injection antenna for the purpose of obtaining reversal of an indicating voltage actuating a synchronously-operated visual indicating means, without the need for switching means in the signal-frequency circuits.

Still another object of my invention is to provide a control arrangement for assuring constant frequency heterodyne waves in the receiver outputs together with the frequency shifting arrangement.

A still further object of my invention is to provide a coupling arrangement between injection antenna and receiving antenna by which the current in the injection antenna and the resulting field may be reduced for avoiding local interference in the heterodyne frequency control arrangement.

Other and further objects of my invention reside in the system and circuit arrangements disclosed and hereinafter described in more detail with reference to the accompanying drawings, in which:

Figure 1 is a block diagram illustrating the heterodyne direction finding system provided with the frequency shifting means of my present invention; Fig. 2 is a detailed schematic diagram of the synchronized sweep voltage and square wave generator embodied in Fig. 1; Fig. 3 is a schematic diagram of the circuits of the frequency shifting arrangement, in particular, embodied in Fig. 1; Fig. 4 is a graphical representation of the phase characteristic of a tuned circuit, referred to in considering the difference in phase shift between two currents of different frequencies; Fig. 5 is a block diagram of a modified frequency shifting arrangement adaptable to the system of Fig. 1; Fig. 6 is a block diagram of a further modified frequency shifting arrangement incorporating frequency control means; and Fig. 7 illustrates a modified coupling arrangement for the injection and receiving antennas especially adaptable for operation together with the frequency control arrangement of Fig. 6.

The frequency-shift principle, applied to a heterodyne direction finder with loop receiving or collector antennas, loop injector antenna, and oscilloscopic indicating means, is illustrated diagrammatically in Fig. 1. The general arrangement is similar to that disclosed in detail in my copending application Serial No. 294,522, supra, and portions thereof are grouped together for ready reference. The elements within the broken line at 1 constitute the rotatable collector-injector antenna system; those at 2 comprise a dual channel, superheterodyne receiving system with conventional radio frequency amplifier, first detector, intermediate frequency amplifier and second detector stages; and those at 3 include the oscilloscope indicating means and the circuits for obtaining a vertical deflection of the electron beam in the oscilloscope approximately proportional to the phase difference of the audio frequency outputs from the two receiving channels. The elements within the broken line at 4 comprise an oscillator-mixer arrangement, the circuits of which are shown in detail in Fig. 3, for obtaining the voltage for the injector antenna as well as the heterodyning voltage for the first detectors of the dual receiving system at 2, replacing in the latter instance the first oscillators of conventional superheterodyne receiver circuits.

The basic operation of the system of Fig. 1 is similar to that disclosed in detail in my copending application, Serial No. 294,522, supra, and is substantially as follows. Signal energy is received at both loop antennas 101 and 102 simultaneously with energy from the injector loop 103. Antenna 101 is connected with radio frequency amplifier 201 and thence to the first detector 203 of one superheterodyne receiving circuit wherein both signal and injector voltages are converted to intermediate frequency by energy supplied from the oscillator-mixer arrangement 4, which will be described in more detail. The converted energy passes then through the remainder of the superheterodyne receiving circuit at 205 which includes second detector means wherein the intermediate frequency components derived from the signal and injection voltages combine to produce an audio beat frequency current by heterodyning action for energizing an output transformer 301. At the same time, antenna 102 supplies signal and injection voltages to amplifier 202 and thence to the first detector 204 of a second superheterodyne receiving circuit, for conversion to intermediate frequency by energy from the oscillator-mixer arrangement at 4 similarly as the voltages in the first detector 203. From the first detector 204, the intermediate frequency components are passed through the remainder of the respective superheterodyne receiving circuit at 206, including the second detector means, for producing from the signal and injection derivatives a separate audio beat frequency current which is applied to output transformer 302.

Transformers 301 and 302 have split secondary windings whereby sum and difference voltages are obtained in combining the beat frequency outputs of the separate superheterodyne receiving circuits, the sum voltage being applied through a phase shifting combination 303—304 to amplifier 307 while the difference voltage is applied through a phase shifting combination 305—306 to amplifier 308. The sum and difference voltages in the amplifiers 307 and 308 are of like phase, the phase shifting combinations 303—304 and 305—306 being effective to counteract the phase quadrature relationship of the sum and difference voltages as produced. The outputs of amplifiers 307 and 308 are applied to a balanced rectifier 309, shown as a doubly balanced or "ring" type, which delivers a direct current proportional to the phase difference of the currents applied to transformers 301 and 302. The output of rectifier 309 is applied to the deflecting electrodes of cathode ray tube 310, which is energized also by a sweep voltage from the means at 5.

That the output of rectifier 309 is, in fact, proportional to the phase difference of the currents applied to transformers 301 and 302 is evident from the dependence of the balanced type rectifier on the presence of both sum and difference components for operation. Where the currents in transformers 301 and 302 are in phase, indicating reception in like phase at the loop antennas 101 and 102, the difference voltage is zero; whereas when there is a phase difference between the output currents of the separate superheterodyne receiving circuits, there is a definite difference voltage component applied to amplifier 308 which is proportional to the phase difference and results in the production of a corresponding direct current in the output of rectifier 309 for deflection of the beam in the cathode ray oscillograph 310.

The substantial elimination of bearing errors caused by phase inequalities introduced in the antenna circuits and the superheterodyne receiver circuits is effected by a novel frequency shifting arrangement, involving the frequency of injection and conversion voltages relative to the frequency of the signal voltage. The principles involved are set forth in detail hereinafter, but reference is first made to the means employed to produce the required frequency shift.

Both the injection voltage and the first detector heterodyning voltage are periodically shifted in frequency by the frequency shift means, in the portion 4, under the control of a square wave generator operating in synchronism with the horizontal deflection voltage generator in the portion at 5. Fig. 2 illustrates one form of apparatus which may constitute the portion 5. In Fig. 2, commutator discs 6 and 7 are mounted on a common shaft driven by motor 8. In operation, disc 6 provides alternate current paths from ground through resistor 9 or resistor 10, both of which are connected as potentiometers across a source of bias potential 11. The tap connections on resistors 9 and 10 are made at different positions for thereby supplying different bias potentials for control of the frequency shift means, as will be further explained. In operation, disc 7 provides a conductive path for momentarily shunting a condenser 12, for discharging the condenser which, during the remainder of the cycle, is charged through resistance 14 from source of potential 15. The cyclically varying voltage of saw-tooth wave form thus produced across condenser 12 is suitable for controlling the horizontal deflection of the oscilloscope ray.

Discs 6 and 7 are relatively so disposed that condenser 12 is discharged synchronously with one of the commutations effected by disc 6 which is preferably constructed to provide at least two commutations per cycle of deflection voltage. If the collector system 1 is rotated "off bearing," the out of phase condition is indicated by a vertical deflection of the beam which reverses with frequency shift so that a broken line image results on the screen of the oscilloscope, as indicated in Fig. 1. Out of phase conditions caused by difference in phase delay between the two receiver channels, however, will produce the same vertical deflection regardless of frequency shift so that the indication afforded by a broken line image is substantially a directional indication.

In Fig. 1, the numerals written near the oscillators and mixers of portion 4 represent the frequency in kilocycles of their respective outputs for receiving a signal of 2000 kilocycles. The numerals in parentheses represent the frequency for one half of the frequency shift cycle, and the plain numerals represent the frequency during the other half of the cycle. For a constant audio tone of two kilocycles in the receiver, it is seen that the injection voltage to the antennas must be 1998 kc. or 2002 kc. If a nominal intermediate frequency of 450 kc. is chosen, the heterodyning voltage supplied directly to the first detectors must be 2449 or 2451 kc. Under these conditions the signal and the injection frequencies, as they appear in the intermediate frequency amplifier circuits "trade places," as is required if bearing error in the intermediate frequency amplifiers is to be eliminated entirely.

In Fig. 3, the tubes, resistors, blocking and by-pass condensers, and other circuit elements are represented by conventional symbols and have functions well understood by the radio profession. Each tuned circuit is identified by a numeral representing the nominal frequency to which it is tuned, when receiving a signal of 2000 kc. Circuits 2850, 2450, and 2000 are tracked with the receiver tuning control, while circuits 50, 400, and 450 are of fixed tuning. The oscillator tubes are at 16, 17 and 18; 19 is an isolating buffer amplifier, and 20, 21 and 22 are mixers. A frequency control tube 23, with circuit similar to that employed in present-day radio receivers with automatic frequency control, constitutes the frequency shift means. That is, resistor 24 and condenser 25 of Fig. 3 supply the grid of tube 23 with voltage essentially in phase quadrature with the grid voltage of tube 17. The grid bias of tube 23 is changed periodically by the square wave generator of Fig. 2, and the plate circuit of tube 23 affects the oscillation frequency of oscillator 17 by a corresponding amount.

Oscillations from tubes 16 and 17 are supplied mixer 20, producing the approximately 2450 kc. voltage required by the first detectors and mixer 22. Amplifier 19 supplies the approximately 400 kc. voltage from tube 17 to mixer 21, and prevents any reaction from oscillator 18 back to oscillator 17. Oscillator 18 supplies 50 kc. voltage to mixer 21, which produces approximately 450 kc. voltage required by mixer 22 to produce the approximately 2000 kc. voltage required in the injector loop.

The principles involved in the system of my invention include the effect on the phase of a current which has a frequency slightly different from the resonant frequency of a tuned circuit through which it passes. It is well known that the phase delay characteristic of any tuned circuit has always a positive slope, such that if two frequencies are present, the higher frequency undergoes the greater phase delay, in electrical degrees. The phase delay of the audio heterodyne note resulting from the heterodyne or "beat" between the two frequencies is equal to the difference in delay at the two frequencies. For example, if the lower frequency wave is delayed ten degrees, and the higher frequency wave is delayed twelve degrees, the heterodyne tone will be delayed two degrees. Because the phase delay versus frequency curve has always a positive slope, the heterodyne tone is always delayed in phase, never advanced, by the action of tuned circuits in receivers of conventional design.

Fig. 4 shows a curve of the calculated slope of the phase-delay characteristic of a tuned circuit whose Q, or ratio of reactance to resistance, is 50. The abscissa $\Delta$ is in percent of resonant frequency, so that negative values of $\Delta$ represent frequencies below resonance and positive values represent frequencies above resonance. $f_0$ represents the resonant frequency, $f$ represents the mean of the two frequencies $f_2$ and $f_1$ which produce the heterodyne tone of frequency $f_2-f_1$. The ordinate scale shows the slope of the phase characteristic, $$\frac{d\phi}{dn}$$

where $\phi$ is the phase delay in radians, and $dn$ is approximately $$\frac{f_2-f_1}{f}$$

By dividing the ordinate by the frequency $f$ in cycles per second, an ordinate scale $$\frac{d\phi}{df}$$

will be obtained, in radians phase shift per cycle per second frequency interval. That is, the phase delay in radians of the audio heterodyne tone $f_2-f_1$ between waves of frequency $f_2$ and $f_1$, may be calculated by multiplying $$\frac{d\phi}{df}$$

by $f_2-f_1$.

It is of importance here to consider that, if $f_1$ is the signal frequency as it appears in the intermediate frequency amplifier of the receiver and $f_2$ is the corresponding frequency of the locally injected energy, the phase delay of the audio tone caused by the tuned circuit will be given by $$\frac{d\phi}{df}(f_2-f_1)$$

If means are provided to shift these intermediate frequencies so that the signal frequency takes the value $f_2$ and the locally injected frequency $f_1$, the magnitude of the phase shift will not be changed, and the effect will still be a delay, instead of an advance, in the audio frequency phase. Hence, an indicator system the deflection of which is proportional to the phase difference between two audio tones from separate receivers, will not show a change of indication when the two frequencies $f_2$ and $f_1$ are interchanged.

If, instead of interchanging the two frequencies, the signal frequency $f_1$ is left unchanged and the locally injected frequency is changed from $f_2$, which is 2,000 cycles per second higher than $f_1$, for example, to some frequency $f_3$, 2,000 cycles per second lower than $f_1$, the audio phase delay will be $$\frac{d\phi}{df_A}(f_1-f_3)$$

instead of $$\frac{d\phi}{df_B}(f_2-f_1)$$

where $$\frac{d\phi}{df_A} \text{ and } \frac{d\phi}{df_B}$$

represent the slope of the phase delay versus frequency curve evaluated at two slightly different frequencies. That is, $$\frac{d\phi}{df_A}$$

is evaluated at a frequency which is the mean of $f_1$ and $f_3$, and $$\frac{d\phi}{df_B}$$

is evaluated at the mean frequency of $f_2$ and $f_1$.

Since $f_1-f_3=f_2-f_1$, the only change in phase delay with frequency shift will be that caused by the difference in slope. In the antenna and signal frequency circuits, this change will be quite small, so that the bearing error caused by phase differences in the signal frequency circuits of the two antennas and receivers will be substantially eliminated. In the intermediate frequency circuits, the change in $$\frac{d\phi}{df}$$

for a frequency shift of 2000 cycles per second will be appreciable, however, so that the two frequencies should be interchanged, rather than the locally injected frequency merely being moved from one side of the signal frequency to the other, if bearing errors are to be eliminated completely.

The operation of the direction finder of this invention depends upon the fact that when the frequencies are shifted as described above, so as to maintain the beat-note frequency constant, the phase delay caused by the antenna and receiver circuits does not change with frequency shift, but the sense of the audio phase difference caused by the antenna system being rotated slightly "off" bearing" reverses with frequency Let $$a=2\pi f_a$$

and $$b=2\pi f_b$$

where $f_a$ and $f_b$ are two frequencies 2000 cycles apart, with $f_a$ the higher frequency so that $f_a-f_b=2000$ c. p. s. When the antenna system is rotated "on bearing," let the locally injected voltage at one collector antenna be $\cos at$ and the signal voltage $\cos bt$. Disregarding phase shift in the receivers, if these two voltages are combined in a square law detector, the audio output of the detector can be obtained from $$(\cos at+\cos bt)^2=\cos^2 at+2\cos at\cos bt+\cos^2 bt$$

The audio output will be found entirely in the second term of the expression above, so that $$2\cos at\cos bt=\cos(a+b)t+\cos(a-b)t$$

The term $\cos(a-b)t$ represents the audio signal from one receiver when the antenna system is on bearing. It may be seen that the expression does not depend upon whether $f_a$ or $f_b$ is the signal frequency, so long as $F_a$ is the higher frequency, $F_b$ is the lower frequency, and the two waves arrive with zero reference phase and are given by the expression $\cos at+\cos bt$.

Suppose, now, that the loop is rotated "off bearing" so that the collector antenna in question is moved toward the transmitter and the phase of the signal voltage at the antenna is advanced by an angle $\theta$. If the signal voltage is of higher frequency than the locally-injected voltage, the sum of the two voltages will be $$[\cos(at+\theta)+\cos bt]^2$$

The audio output is found as before:

$$[\cos(at+\theta)+\cos bt]^2= \ldots +2\cos(at+\theta)\cos bt+ \ldots = \ldots +\cos[(a-b)t+\theta]$$

which shows that the phase angle of the audio tone has been advanced by an angle $\theta$.

If the signal voltage is of lower frequency, however, the sum of the two voltages will be $$\cos at+\cos(bt+\theta)$$

The audio output is found from $$[\cos at+\cos(bt+\theta)]^2= \ldots +2\cos at\cos(bt+\theta) \ldots = \ldots +\cos[(a-b)t-\theta]$$

which shows that the phase angle of the audio tone has been retarded by an angle $\theta$. Hence, if the two receivers are connected to individual collector antennas excited by the signal voltage and a locally injected voltage differing therefrom by an audio frequency, and if an indicating device is cooperatively energized by the outputs of the two receivers so that its indication depends upon phase difference between the outputs of the receivers, its indication will reverse when the locally injected frequency is changed from a frequency above the signal frequency to a frequency an equal interval below the signal frequency. More specifically, that portion of the indicator deflection due to off-bearing orientation of the antenna system will reverse with frequency shift, while that portion due to unequal delay in the two receiver circuits will remain unchanged.

In Fig. 5 I have illustrated a simplified arrangement for obtaining the heterodyning and injection voltages in the portion 4 of the system. The operation is apparent from the drawings on which the output frequencies at the various elements are noted similarly as in Fig. 1. One oscillator stage and one mixer stage have been eliminated, and a frequency doubler 26 is added. The frequency shift means at 27 in connection with oscillator 28 may be similar to the means 23 connected with oscillator 17, Fig. 3. The high frequency oscillator 29 supplies energy to two mixers 30 and 31, while oscillator 28 supplies energy directly to mixer 30 and through frequency doubler 26 to mixer 31, for obtaining the desired frequencies. As indicated in Fig. 5, therefore, it is evident that various arrangements may be provided for deriving the various frequencies required; and likewise it will be understood that frequency shifting means other than the arrangement disclosed in Fig. 3 may be provided.

Fig. 6 illustrates diagrammatically one arrangement for obtaining a constant audio frequency tone with frequency shift that does not require precise receiver tuning. Assuming the signal frequency is 2000 kc., a 2850 kc. oscillator 16' operates a mixer 20' in conjunction alternately with a 401 kc. oscillator 40 and a 399 kc. oscillator 41, selected by means of the switching means shown at 32, to produce alternately the 2449 kc. and 2451 kc. energy required by the first detectors of the receivers. Position A of the switch 32 represents the connection for one half of the frequency shift cycle, and position B represents the connection for the other half. Plain figures near circuit elements represent output frequency in kilocycles corresponding to position A, while figures in parentheses correspond to position B.

In addition to the two receivers in the direction finder proper, a third, or monitoring receiver 33 is connected through a long shielded transmission line 34 to a distant antenna 35, and has its first detector 36 energized by the same 2449/2451 kc. energy that operates the other two receivers. The signal then appears alternately as 449 kc. and 451 kc. in the intermediate frequency amplifier 37 of this receiver, and is combined in a mixer 38 alternately with 399 kc. and 401 kc. energy to produce a constant 50 kc. output, which passes through a 50 kc. selective circuit 39 to another mixer 21' in which it is combined alternately with 401 and 399 kc. energy to produce alternately 451 and 449 kc. energy, which is combined alternately with 2449 kc. and 2451 kc. energy to produce alternately 1998 kc. and 2002 kc. energy which is fed to the injector antenna.

It is seen that the required frequency shift of the injection voltage and the heterodyning voltage to the first detectors is thus accomplished by the circuit of Fig. 6. More important is the fact that the audio tone remains constant with frequency shift even through the 2850 kc. oscillator is not tuned exactly 850 kc. above signal frequency. For example, if the signal frequency were 2010 kc. instead of 2000 kc., and the 2850, 401 and 399 kc. frequencies unchanged, the output of the monitoring receiver would be 439 kc. and 441 kc. instead of 449 and 451 kc., the output of the next mixer would be 40 kc. instead of 50 kc., the output of the next mixer would be 441 kc. and 439 kc., and the antenna injection voltage would be the required 2008 and 2012 kc. The band width of the 50 kc. selective circuit would of course have to be such as to accommodate the degree of mistuning expectable.

The circuit of Fig. 6 thus provides a fully automatic frequency shift for the direction finder without requiring unusually close control of oscillator frequencies. However, the distant antenna must be far enough away from the direction finder antenna so as to have negligible pick up of the injector antenna voltage. If injection voltage were picked up at the distant antenna, the circuit would treat this voltage exactly like a signal voltage and generate another injection voltage 2 kc. farther removed, and so on. The remote antenna must also be far enough away to avoid distorting the field at the direction finder. It should be an untuned vertical antenna of sufficient height to provide a reliable signal for the monitoring receiver.

To reduce the field at the remote antenna due to the injection voltage, the injection antenna may be replaced by two small injection loops fed through transmission lines as shown in Fig. 7. Because the injection loops are close to the collector antennas, the injection loop current need not be great and the resulting field at a distance will be much smaller. As shown, the injection loops are disposed in the planes of the collector loops for maximum mutual inductance.

The frequency shift effected in accordance with my invention produces the required reversal of the indicating voltage by advancing or retarding the phase of the signal current according to whether the signal frequency is higher or lower, respectively, than the injection voltage, as above explained. The result is the same as that effected by commutation of the antennas as disclosed in my copending application Serial No. 294,522, supra, although produced by frequency shift in the separate receiving circuits and not by interchange of the signals from the two receiving antennas in the two receiving circuits, by commutation.

While the frequency shifting is shown to be effected by mechanical means, including the commutator disc 6 in Fig. 2, and the switch means 32 in Fig. 6, electronic tubes and circuits or other suitable means may be employed. Similarly, the semi-mechanical sweep voltage generator, including disc 7 in Fig. 2, may be replaced by electronic or other suitable means and synchronism established with the frequency shifting arrangement.

Thus, while I have described my invention in certain preferred embodiments, I desire it understood that modifications may be made, and that no limitations upon my invention are intended except as defined in the appended claims.

What I claim as new and desire to secure by Letters Patent of the United States is as follows:

1. In a heterodyne radio direction finding system including at least two receiving antennas and superheterodyne receiving circuits, locally energized injector antenna means coupled in like relation to said receiving antennas, each of said superheterodyne receiving circuits having components of intermediate frequency derived from signal energy and from injected energy, means for producing an indicating direct voltage proportional to the phase difference in the currents at the outputs of the superheterodyne receiving circuits, and visual indicating means energized by said voltage; the method of maintaining the significant phase difference in said output currents substantially equal to an off-bearing phase difference in signal waves incident at said receiving antennas which consists in shifting the frequency of the injection energy through a predetermined frequency range for producing intermediate frequencies in the receiving circuits such that the signal derivative has a frequency alterately higher and lower than the injection derivative in each of said receiving circuits, the output currents being advanced in phase when the signal derivatives are of higher frequency and retarded in phase when the signal derivatives are of lower frequency by an amount in each instance proportional to the off-bearing phase displacement of the signal wave at the respective antenna, whereby the phase difference of the signal waves at the antennas may be determined from the relative phases of the output currents of said receiving circuits.

2. In a heterodyne radio direction finding system, the method of maintaining phase relations as set forth in claim 1 and including the step of shifting the frequency of the conversion energy in the superheterodyne receiving circuits synchronously with the shifting of the frequency of the injection energy and through an equal frequency range for maintaining the mean frequency of the signal and injection derivatives constant in the signal receiving circuits.

3. In a heterodyne radio direction finding system the method of maintaining phase relations as set forth in claim 1 and including the step of monitoring the frequency of the signal energy independently of direction finding, and modifying the frequency of the injection energy in accordance with changes in the signal frequency for maintaining a constant frequency relation therebetween.

4. In a heterodyne radio direction finding system, the method of maintaining phase relations as set forth in claim 1 and including the steps of shifting the frequency of the conversion energy in the superheterodyne receiving circuits synchronously with the shifting of the frequency of the injection energy and through an equal frequency range for maintaining the mean fre- 2 408 121 currents being reversed with the shifting of the frequency of the injection energy, and the magnitude of the phase difference between the output currents being proportional in each instance of phase reversal to the phase difference of the signal waves incident at the receiving antennas.

12. In a heterodyne radio direction finding system, including at least two receiving antennas, separate receiving circuits having detector means, injector antenna means coupled in like relation to said receiving antennas, means for energizing said injector antenna means for supplying heterodyne energy to said receiving antennas, means for producing an indicating direct voltage proportional to the phase difference in the currents at the outputs of said receiving circuits, and visual indicating means energized by said voltage; the method of maintaining the phase difference in said output currents substantially equal to the phase difference in signal waves incident at the receiving antennas which consists in shifting the frequency of the injection energy from a value lower than the signal frequency to a value an equal degree higher than the signal frequency, the relative phase of the output currents and the polarity of the indicating direct voltage being reversed with the shifting of the frequency of the injection voltage, and the magnitude of the phase difference between the output currents and of the indicating direct voltage being proportional in each instance of respective phase and polarity reversal to the phase difference of the signal waves incident at the receiving antennas.

13. In a heterodyne radio direction finding system, at least two receiving antennas, separate receiving circuits including detector means, injector antenna means coupled in like relation to said receiving antennas, means for energizing said injector antenna means alternately at frequencies lower and higher than the signal frequency for supplying heterodyne energy to said receiving antennas, means for producing an indicating direct voltage proportional to the phase difference in the output currents of said receiving circuits, the relative phase of said output currents and the polarity of said direct voltage being reversed with change in frequency of the injection energy, and the magnitude of the phase difference between the output currents and of the direct voltage being proportional in each instance of respective phase and polarity reversal to the phase difference of the signal waves incident at the receiving antennas, and visual indicating means energized by said voltage.

14. In a radio direction finding system, the combination set forth in claim 13, with said receiving antennas constituted as loop antennas, and said injector antenna means comprising a diminutive loop antenna in the plane of each receiving antenna and disposed substantially central of the respective receiving antenna for minimizing the radiation field of the injection energy.

15. In a radio direction finding system, the combination set forth in claim 13, with said receiving antennas constituted as loop antennas, and said injector antenna means comprising at least one diminutive loop antenna in the plane of each receiving antenna, said diminutive loop antennas being arranged for inducing substantially equal voltages in the respective receiving antennas.

16. In a radio direction finding system, the combination set forth in claim 13, with said receiving antennas constituted as tuned loop antennas, and said injector antenna means comprising a diminutive untuned loop antenna in the plane of each receiving antenna, said diminutive loop antennas being arranged for inducing substantially equal voltages in the respective receiving antennas.

17. In a heterodyne radio direction finding system, at least two collector loop antennas, separate receiving circuits including detector means connected with said collector loop antennas, at least one diminutive injector loop antenna in the plane of each collector loop antenna, a transmission line interconnecting all said diminutive injector loop antennas, means for energizing said injector loop antennas through said transmission line, said injector loop antennas being arranged for inducing substantially equal voltages in the respective collector loop antennas, means for producing an indicating direct voltage proportional to the phase difference in the output currents of said receiving circuits, and visual indicating means energized by said direct voltage.

WALTER H. WIRKLER.